July 5, 1949.  R. L. HASCHE  2,475,282
PROCESS OF PRODUCING ACETYLENE BLACK
Filed Jan. 21, 1946  2 Sheets-Sheet 1

INVENTOR:
RUDOLPH LEONARD HASCHE,
HARRIS, KIECH, FOSTER & HARRIS,

FOR THE FIRM
ATTORNEYS.

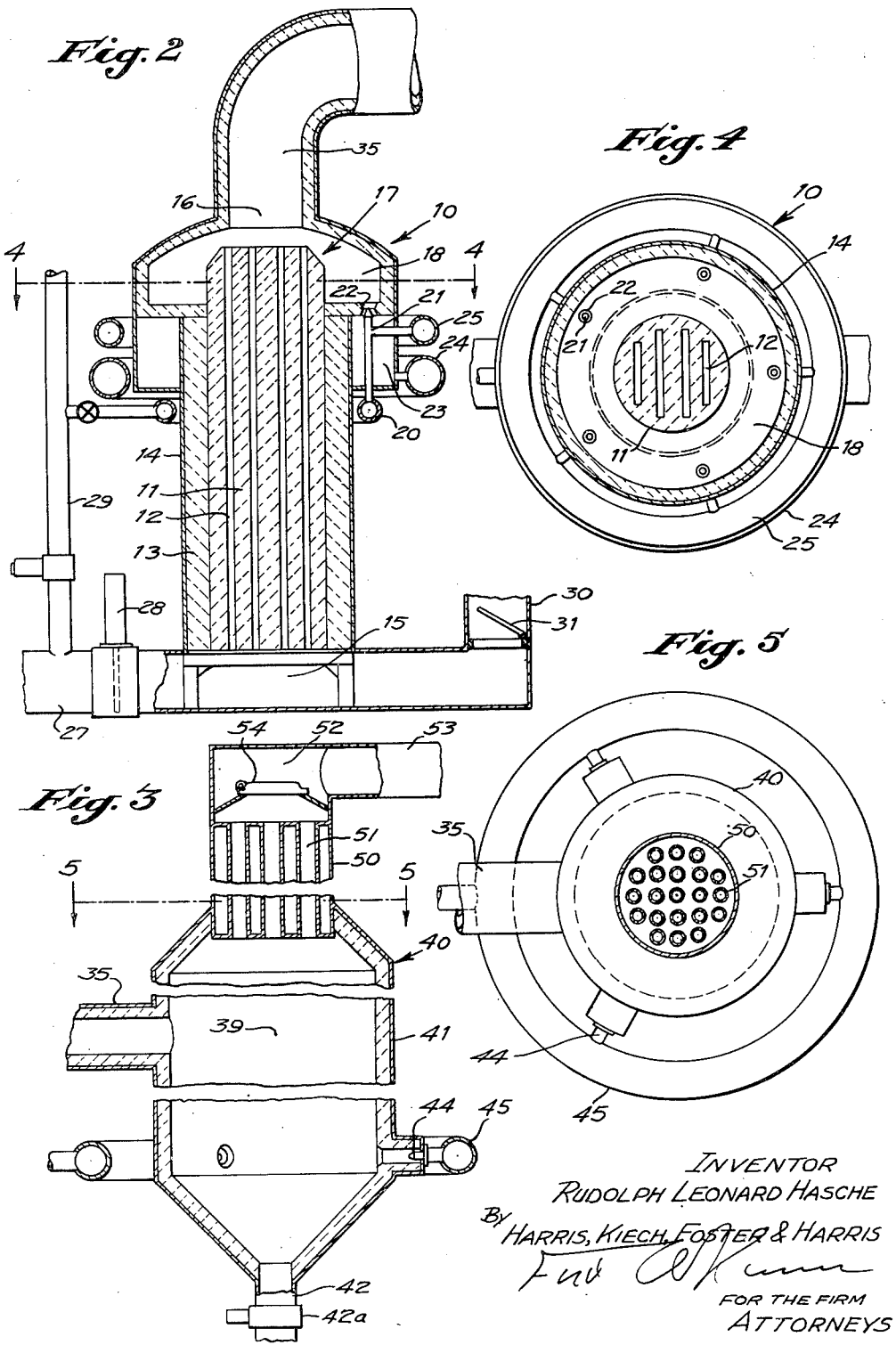

Patented July 5, 1949

2,475,282

UNITED STATES PATENT OFFICE 2,475,282

PROCESS OF PRODUCING ACETYLENE BLACK

Rudolph Leonard Hasche, Johnson City, Tenn., assignor to Tennessee Eastman Corporation, Kingsport, Tenn., a corporation of Virginia Application January 21, 1946, Serial No. 642,453

2 Claims. (Cl. 23—209.4)

My invention relates to the art of producing finely divided carbon particles and, more particularly, to the art of producing such particles from acetylene. Carbon particles produced from acetylene are commonly called "acetylene black," acetylene black being a standard article of commerce which at the present time is used as a filling for dry batteries and for other purposes. Acetylene black could, with great advantage, be used for many purposes for which it cannot now be used due to its high cost. The present high cost of acetylene black is due to the fact that it is now produced from acetylene which is made from calcium carbide, the calcium carbide being made in an electric furnace in which the large and necessary heat of reaction is supplied by electric power, which is necessarily expensive.

The principal object of my invention is to provide a process and apparatus in which acetylene black may be produced directly from hydrocarbons, preferably from methane, natural gas, or other gaseous mixtures which are predominantly methane. There are available plentiful supplies of such hydrocarbons which may be obtained at low cost. Such hydrocarbons are hereinafter called "charging stock."

In my process the charging stock is first converted into acetylene, and the acetylene is then disassociated to form carbon and hydrogen.

Further objects and advantages will be made evident hereinafter.

Referring to the drawings,

Fig. 2 is a vertical cross section through a regenerative furnace of the type which I prefer to use in my process;

Fig. 3 is a vertical cross section through a soaking chamber and quencher suitable for use in my process;

Figure 1:
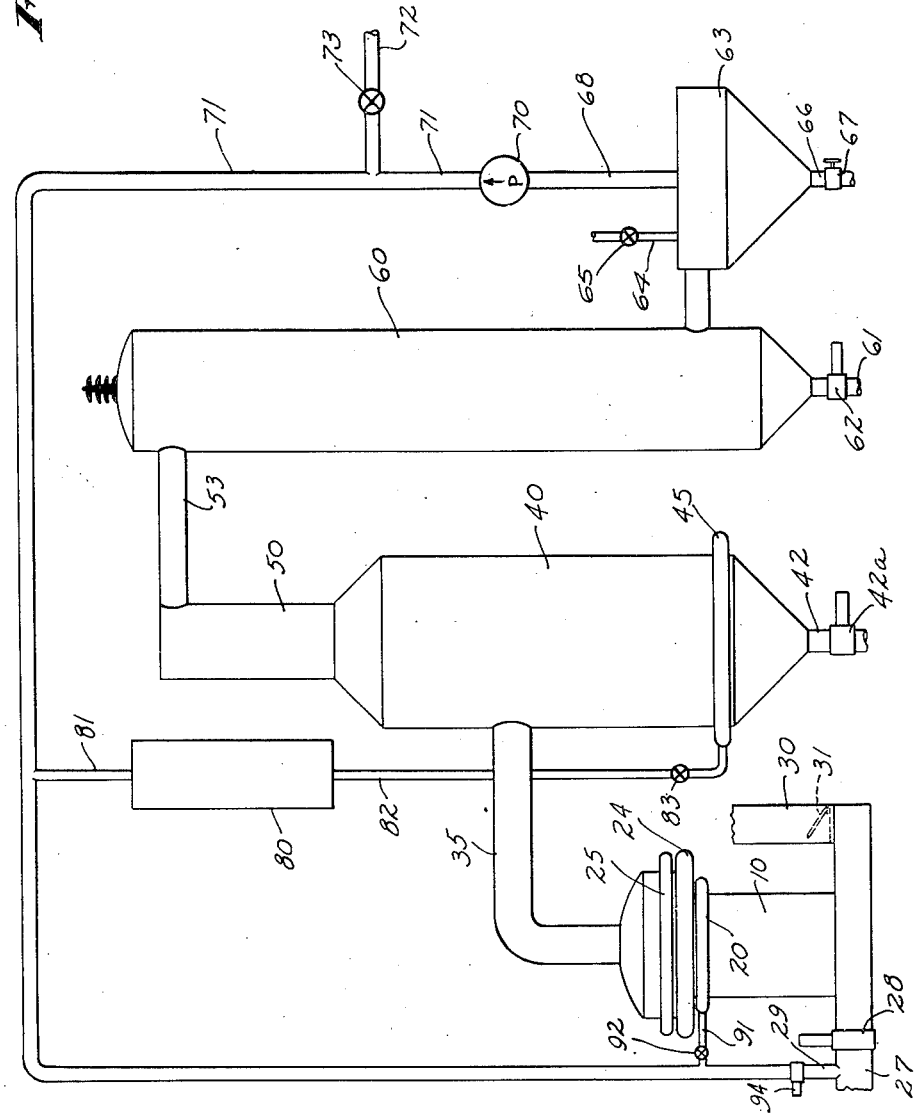
Fig. 1 is an elevation of an apparatus adapted to be used in my process.

Fig. 4 is a cross section through the furnace shown in Fig. 2 on a horizontal plane identified by the line 4—4 of Fig. 2, this plane being viewed in the direction of the arrows adjacent the line 4—4; and Fig. 5 is a horizontal section through the soaking chamber shown in Fig. 3 on a plane identified by the line 5—5 of Fig. 3, this plane being viewed in the direction of the arrows adjacent the line 5—5.

In Figs. 2 and 4 I show a regenerative furnace 10 which is well adapted for use in my process. In this furnace 10 I use a cylindrical regenerative mass 11 which has passages 12 extending vertically therethrough and which is surrounded by a layer of heat insulating material 13 carried in a steel shell 14. This mass 11 is formed preferably of carborundum bricks, and the passages 12 are preferably straight and uninterrupted, serving to connect a primary space 15 below the mass with a secondary space 16 above the mass. Surrounding the upper end of the mass 11 and communicating with the secondary space 16 through an annular throat 17 is a combustion chamber 18. Fuel gas from a manifold 20 is introduced into the combustion chamber 18 through a plurality of burners 21, air being introduced into the combustion chamber 18 adjacent the burners 21 through openings 22 from an air chamber 23 fed with air from an air manifold 24. A purging agent, such as hydrogen, may also be forced into the chamber 18 through the burners 21 from a purging manifold 25.

Charging stock may be fed into the primary chamber 15 through a conduit 27 having a charging stock shutoff valve 28 therein. Hydrogen may be introduced into the charging stock through a pipe 29.

The furnace operates on a cycle which repeats itself periodically, and which includes a firing period of about sixty seconds and a treating period of about forty-five seconds, the remaining fifteen seconds of the cycle being consumed in purging and valve changes. The valves, some of which are not shown, are operated by means (not shown) controlled by a timer (not shown), such valves, operating means, and timer therefor being well known and readily supplied by any man skilled in the art who comprehends what results are desired.

During the firing period, combustion occurs in the combustion chamber 18, the hot gases of combustion being drawn through the throat 17 and downwardly through the passages 12, thereby heating the regenerative mass 11. The combustion gases are then drawn from the primary space 15 into the stack 30 through the valve 31, which is open, the valve 28 being closed during the firing period. Subsequent to the firing period and prior to the treating period, the furnace may be purged by hydrogen or steam from the purging manifold 25.

The passages 12 are more numerous than shown in the drawings, and smaller in width than shown in the drawings, which are purely illustrative.

Opening out of the top of the chamber 16, which is lined with heat resisting material, such as carborundum, is a conduit 35, which is also so lined. The conduit 35 conducts hot gases to a soaking chamber 40, which consists of a steel shell 41 lined with carborundum bricks enclosing a soaking space 39. The bottom of the soaking chamber is conical, terminating at its lower end in a conduit 42 having a valve 42a therein. The entire apparatus is, of course, supplied with exterior heat insulation (not shown) to cut down heat losses. The gas in the soaking space 39 is maintained at, or slightly below, reaction temperature, or at, say, 1500° C. At this temperature acetylene is quite unstable and brakes down to form free carbon and hydrogen. The volume of the soaking space 39 is sufficiently large to retain the gas flowing therethrough for a period long enough to allow the major portion of the acetylene to so break down. Mounted on the top of the soaking chamber 40 is a cooler 50 having tubes 51 extending vertically therethrough, the space around these tubes being kept filled with water at all times. The tubes 51 connect the soaking space 39 with a space 52 in the top of the cooler 50. Cooled gases are taken from this space 52 by a conduit 53 through a product gas shut-off valve 54. The valve 54 is mechanically operated in proper sequence by the timing mechanism previously mentioned. In practice, the cooler 50 is, in effect, a steam boiler which is kept full of water and from which steam is withdrawn as in any such boiler, auxiliary equipment (not shown, but well known in the boiler art) being supplied for this purpose.

The purpose of the regenerative furnace is to convert a portion at least of the methane, entering the furnace through the conduit 27, into acetylene which is delivered in a gaseous mixture in which it is carried through the conduit 35 to the soaking space 39. During the treating period, charging stock enters the space 15 through the valve 28 from the conduit 27, and flows upwardly through the passages 12, where it is heated and nearly all the methane is changed to acetylene, the mixture of gases containing the acetylene passing out through the conduit 35 to the soaking space 39.

Hydrogen injection nozzles 44 are provided which deliver cold hydrogen to the lower portion of the soaking space 39. The flow of this hydrogen is thermostatically controlled to limit the temperature in the top of the soaking space to between 1200° C. and 1500° C. The reaction in the soaking space 39 from acetylene to free carbon and hydrogen is, of course, exothermic, large amounts of heat being released, and cold hydrogen is introduced through the nozzles 44 to prevent the temperature in the soaking space 39 rising to a value higher than the space itself can stand without injury. The nozzles 44 are fed with cold hydrogen from a manifold 45.

A substantial portion of the acetylene black is precipitated in the soaking space 39, but the finer particles thereof are carried in the gas stream through the tubes 51 and the conduit 53 into a precipitator 60. The gases have been cooled in the cooler 50, but should preferably be at a temperature substantially above the boiling point of the tars which are carried as vapors in the gas stream, so that these tars will not condense in the precipitator. In the precipitator the fine particles of acetylene black are separated from the gas stream and delivered to the bottom of the precipitator, where they are removed through a pipe 61 having a valve 62. The gas, largely freed from acetylene black particles, then passes to a tar separator 63 of conventional form, where the gases are cooled and the tar is removed therefrom by passing the gas through water. Water is supplied to the separator 63 through a pipe 64 having a valve 65, and water and tar are removed through a pipe 66 having a valve 67. The cooled gas, substantially free from tar, is then delivered through a pipe 68 to a pump 70. This pump acts as an exhauster, causing a partial vacuum in the pipe 68 for the purpose of drawing the gas through the apparatus 10, 40, 50, and 60, and delivers this gas under superatmospheric pressure to a pipe 71. The gas at this point is predominantly hydrogen, although it may contain some methane. The process, of course, acts to form acetylene from methane, thus releasing hydrogen, and later to break down the acetylene into carbon and hydrogen. More hydrogen is released than can be used in the process, and this excess is withdrawn from the pipe 71 through a pipe 72 having a valve 73.

A portion of the hydrogen from the pipe 71 is delivered to a cooler 80 through a pipe 81 and passes through a pipe 82 having a thermostatically controlled valve 83 therein to the manifold 45. This hydrogen is used to restrain the temperature of the soaking space 39. A portion of the hydrogen from the pipe 71 passes through a pipe 91 having a valve 92 therein and is used to form combustion gases to heat the regenerative mass 11. A portion of the hydrogen passes through a valve 94 in the pipe 29 and supplies the hydrogen used as an accelerator in the charging stock. The charging stock delivered through the conduit 27 will therefore be predominantly a mixture of methane and hydrogen, and the apparatus should be so regulated that the charging stock contains more hydrogen by volume than methane. Good results are obtained if the charging stock contains 65% by volume of acetylene.

The operation of the process may be summarized as follows:

The regenerative mass 11 is heated during the heating period by combustion products to as high a temperature as the materials used in the furnace will stand without too rapid deterioration. This maximum safe temperature, using materials available at this time, may be set at 3000° F. The regenerative mass is periodically reheated so that it is always able to heat the charging stock passing therethrough to a temperature at which methane is converted to acetylene. Due to the presence in the charging stock of free hydrogen, which accelerates the reaction from methane to acetylene, the minimum temperature at which acetylene is formed is substantially lower than might be expected, substantial amounts of acetylene being formed at temperatures as low as 1200° F. The treated gas leaving the top of the regenerative mass therefore contains acetylene, hydrogen, and some methane, the amount of methane depending on the completeness of the methane-to-acetylene reaction which occurs in the regenerative mass 11. It is highly desirable that the gas be retained in the regenerative mass for only a fraction of a second to prevent the acetylene from breaking down into carbon and hydrogen therein.

The treated gas is conducted through the conduit 35 to the soaking space 39, which is large enough to allow the treated gas to remain therein long enough to allow the acetylene to break up into acetylene black, or carbon, and hydrogen. This time may be two seconds or longer. Some of the acetylene black settles in the bottom of the soaking chamber and is withdrawn through the pipe 42. The reaction to free carbon and acetylene in the soaking space 39 releases heat, and the temperature is prevented from rising too high by injecting cold hydrogen through the nozzles 43.

The acetylene black formed in the soaking space 39 is, however, in a finely divided state, and much of it will not settle in the bottom of the soaking chamber 40, but must be settled out in the precipitator 60. Before passing the gas to the precipitator 60, it is cooled in the cooler 50 to a temperature slightly above that of any tars carried in the gas, or to a temperatures which may be as low as 500° C. In the precipitator 60, nearly all the finely divided acetylene black is precipitated, being withdrawn through the pipe 61. This acetylene black is of fine quality due to its fine subdivision and the absence of tar therein. This tar is removed in the separator 63, and a gas which is predominantly hydrogen is delivered to the pipe 68.

Applicant's copending application Serial No. 636,725, filed December 22, 1945, also describes a suitable process of electrolytic precipitation of acetylene black.

Hydrogen delivered by the pipe 91 is used as fuel, that delivered by the pipe 29 is used as an accelerator for the methane-to-acetylene reaction, that delivered by the pipe 82 is used to restrain the temperature in the soaking space 39, and excess hydrogen is taken off through the pipe 72. Acetylene black is recovered through the pipes 42 and 61. Ordinarily, the cooler 50 acts as a steam boiler and furnishes more steam than is needed to operate all auxiliaries, such as pumps.

In practice, a high conversion of methane to acetylene black may be expected. Some carbon may be lost in acetylene and methane taken off with the excess gas through the pipe 72 or lost in tars removed from the separator 63, and these losses need not be very large, although considerable losses can be tolerated due to the inherent low cost of the process.

I claim as my invention:

1. A process of producing acetylene black comprising the steps of subjecting a hydrocarbon gas containing a substantial proportion of methane to its dissociation temperature in a furnace for sufficient time to produce a mixed gas containing a substantial proportion of acetylene; passing said mixed gas from said furnace to a chamber at substantially the same temperature to dissociate the acetylene in said mixed gas into acetylene black and a second mixed gas containing a substantial proportion of hydrogen; introducing a heat-absorbing gas into said chamber during dissociation of said acetylene, said heat-absorbing gas being introduced into said chamber in a quantity sufficient to absorb substantially all the heat of dissociation released by the dissociation of acetylene but in a quantity insufficient to cool the mixed gas in said chamber below the dissociation temperature of acetylene; and removing the acetylene black and said second mixed gas from said chamber.

2. A process of producing acetylene black comprising the steps of subjecting a hydrocarbon gas containing a substantial proportion of methane to its dissociation temperature in a furnace for sufficient time to produce a mixed gas containing a substantial proportion of acetylene; passing said mixed gas from said furnace to a chamber at substantially the same temperature to dissociate the acetylene in said mixed gas into acetylene black and a second mixed gas containing a substantial proportion of hydrogen; separately removing said acetylene black and said second mixed gas from said chamber; cooling said second mixed gas to a temperature substantially below the dissociation temperature of acetylene; and returning the cooled gas which is predominantly hydrogen to said chamber to absorb heat resulting from dissociation of the acetylene and to maintain the temperature of the mixed gas in said chamber above the dissociation temperature of acetylene but below a temperature at which said chamber would be damaged.

RUDOLPH LEONARD HASCHE.

REFERENCES CITED

The following references are of record in the file of this patent:

UNITED STATES PATENTS

| Number | Name | Date |
|---|---|---|
| 986,489 | Morehead | Mar. 14, 1911 |
| 1,804,249 | Day | May 5, 1931 |
| 1,844,327 | Lyder | Feb. 9, 1932 |
| 2,261,319 | Wilcox | Nov. 4, 1941 |
| 2,318,688 | Hasche et al. | May 11, 1943 |
| 2,368,828 | Hanson et al. | Feb. 6, 1945 |

FOREIGN PATENTS

| Number | Country | Date |
|---|---|---|
| 24,256 | Great Britain | July 20, 1911 |